US008275243B2

(12) United States Patent
Kientz et al.

(10) Patent No.: US 8,275,243 B2
(45) Date of Patent: Sep. 25, 2012

(54) METHOD AND COMPUTER PROGRAM PRODUCT FOR SYNCHRONIZING, DISPLAYING, AND PROVIDING ACCESS TO DATA COLLECTED FROM VARIOUS MEDIA

(75) Inventors: Julie Kientz, Atlanta, GA (US); Sebastian Boring, Dachau (DE); Gregory Abowd, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1291 days.

(21) Appl. No.: 11/848,522

(22) Filed: Aug. 31, 2007

(65) Prior Publication Data

US 2008/0063363 A1  Mar. 13, 2008

Related U.S. Application Data

(60) Provisional application No. 60/841,619, filed on Aug. 31, 2006.

(51) Int. Cl.
  *H04N 9/80* (2006.01)
(52) U.S. Cl. ...................................... 386/241
(58) Field of Classification Search .................. 386/239, 386/241, 240
  See application file for complete search history.

(56) References Cited

U.S. PATENT DOCUMENTS

| 4,841,387 A | 6/1989 | Rindfuss |
| 4,924,387 A | 5/1990 | Jeppesen |
| 5,535,063 A | 7/1996 | Lamming |
| 5,564,005 A | 10/1996 | Weber et al. |
| 5,583,980 A * | 12/1996 | Anderson ...................... 345/473 |
| 5,600,775 A * | 2/1997 | King et al. ...................... 715/203 |
| 5,613,032 A * | 3/1997 | Cruz et al. ...................... 386/241 |
| 5,717,869 A * | 2/1998 | Moran et al. .................. 715/716 |
| 5,878,186 A | 3/1999 | Bennett et al. |
| 5,970,455 A | 10/1999 | Wilcox et al. |
| 6,665,490 B2 | 12/2003 | Copperman et al. |
| 6,718,061 B2 | 4/2004 | Lapstun et al. |
| 6,897,851 B2 * | 5/2005 | Carini et al. .................. 345/173 |
| 6,912,308 B2 * | 6/2005 | Reintjes et al. ............... 382/181 |
| 6,938,029 B1 * | 8/2005 | Tien ...................................... 1/1 |
| 6,951,541 B2 | 10/2005 | Desmarais |
| 7,058,889 B2 | 6/2006 | Trovato et al. |
| 7,072,908 B2 | 7/2006 | Dideriksen et al. |

(Continued)

OTHER PUBLICATIONS

Tanenbaum, "Structures Computer Organization", pp. 10-12, 1984.*

(Continued)

*Primary Examiner* — David Harvey
(74) *Attorney, Agent, or Firm* — Alicia L. W. Brewster, Esq.; Troutman Sanders LLP

(57) ABSTRACT

A method and computer program product for synchronizing, displaying and providing access to data collected from various media. The method for processing and displaying data from a plurality of media comprises obtaining handwriting data using an electronic writing instrument, recording video data, synchronizing the video data and the handwriting data, and displaying in a single screen the video data, a timeline of the video data, and handwriting data, the timeline indexed according to discrete periods of time. The computer program product comprises instructions for recording time-stamped video and audio data, obtaining time-stamped handwriting data entries from an electronic writing instrument, synchronizing and indexing the video and audio data with the handwriting data, and displaying in a single screen, a first region comprising the handwriting data, a second region comprising the video and audio data, and a third region comprising a timeline of the video and audio data.

18 Claims, 8 Drawing Sheets

U.S. PATENT DOCUMENTS

| | | |
|---|---|---|
| 7,191,095 B2 | 3/2007 | Dries |
| 7,202,803 B2 | 4/2007 | Evans |
| 7,231,135 B2 | 6/2007 | Esenyan et al. |
| 7,548,565 B2 * | 6/2009 | Sull et al. .................. 370/503 |
| 7,551,312 B1 * | 6/2009 | Hull et al. ................... 358/1.18 |
| 7,633,493 B2 * | 12/2009 | Syeda-Mahmood et al. . 345/179 |
| 2003/0091233 A1 | 5/2003 | Lapstun et al. |
| 2004/0193428 A1 | 9/2004 | Fruchter et al. |
| 2005/0005016 A1 * | 1/2005 | Tanaka et al. ............... 709/228 |
| 2005/0005308 A1 * | 1/2005 | Logan et al. ................. 725/135 |
| 2005/0160113 A1 * | 7/2005 | Sipusic et al. ............ 707/104.1 |
| 2006/0075347 A1 | 4/2006 | Rehm |
| 2006/0090127 A1 | 4/2006 | Silverbrook et al. |
| 2006/0189903 A1 | 8/2006 | Poreh et al. |
| 2006/0235726 A1 * | 10/2006 | Paraison et al. .................. 705/2 |
| 2007/0005789 A1 * | 1/2007 | Wu ............................... 709/231 |
| 2007/0067707 A1 * | 3/2007 | Travis et al. ............... 715/500.1 |
| 2007/0124369 A1 | 5/2007 | Wu |
| 2007/0300157 A1 * | 12/2007 | Clausi et al. .................. 715/719 |

OTHER PUBLICATIONS

"Dynomite: A Dynamically Organized Ink and Audio Notebook;" Lynn D. Wilcox, Bill N. Schilit, and Nitin Sawhney; Mar. 1997; ACM Sigchi, Atlanta, Georgia.

* cited by examiner

FIG. 2B

METHOD AND COMPUTER PROGRAM PRODUCT FOR SYNCHRONIZING, DISPLAYING, AND PROVIDING ACCESS TO DATA COLLECTED FROM VARIOUS MEDIA

CROSS REFERENCE TO RELATED APPLICATIONS

This application claims the benefit of U.S. Provisional Application No. 60/841,619, filed 31 Aug. 2006, which is hereby incorporated by reference in its entirety as if fully set forth below.

BACKGROUND OF THE INVENTION

1. Technical Field

The present invention relates generally to a method and computer program product for obtaining and processing data collected from various media.

2. Description of Related Art

Researchers in Computer Supported Cooperative Work have broadened the term "work" in the last few decades to include such things as education, learning, medical care, and a wide variety of other in-home activities. Caring for and educating another person is often an inherently review and analysis intensive effort, including everyone from highly trained professionals to family members with varying experiences.

In the care of individuals with chronic conditions, treatments often span multiple caregivers across extended periods. Caregivers ideally will collect large amounts of data, both qualitative and quantitative, to help determine the effectiveness of various treatments and review these data regularly to adjust the care as needed. Because care is often administered individually, collaboration efforts are important in ensuring that care is administered correctly and consistently. Using recorded data as evidence to support decisions can be crucial for effective treatment.

Although data-based decision-making is an important component of chronic care management, it is not a trivial task. Many times, the task of collecting data is so burdensome that caregivers do not have time to collect it properly. Improper data collection may include missing data points, such as events that happen when no one was expecting them, or unreliable data due to being reported from a caregiver's retrospective memory, perhaps minutes, hours, or days after a moment of interest occurs. Even when data is collected, it might not be presented in a way that is amenable to synthesis and understanding, or it might not be consulted regularly enough to impact the trajectory of treatment in a timely fashion. Additionally, much of the data collected in these settings is paper-based, so it is difficult to make changes, share with others for discussion, make connections between different views of data, and review richer data such as videos or images.

Discrete Trial Training (DTT) therapy is currently a best practice method for teaching academic and life skills to children with autism and other developmental disabilities. In DTT, a team of therapists works individually with a child in a controlled setting. In individual sessions, a therapist instructs the child in a variety of skills in a highly-structured, repetitive manner, helping the child master correct behavior through errorless teaching and positive reinforcement. These skills, grouped as programs, often include academic skills such as word pronunciation, object identification, or counting, but can also include more practical skills, such as toileting or getting dressed.

FIG. 1 illustrates an exemplary paper form used in DTT therapy. Throughout a session, the therapist records grades on a paper form 110 for each trial of all of the skills on which the child is working. After each session, the therapist calculates percentages of trials completed successfully and independently, and plots each program's results on a hand-drawn paper graph-form 120. Finally, if a skill has been "mastered" and thus no longer needs to be actively targeted, she will add new skills to the program. Therapists also write several paragraphs of general notes about the therapy session. These bookkeeping activities usually require 20 to 30 minutes of the therapist's time at the end of each session on the forms. The next therapist may read the collective notes before the next session, an activity that generally takes five or ten minutes.

DTT therapy is used in both home and school settings to teach skills which can later be generalized outside of therapy. Many young children actively engage in anywhere from 10 to 40 hours of therapy per week spread out over one to two hour sessions. The individual therapists working with a child typically participate in weekly or semi-weekly meetings to discuss the child's progress. In these meetings, therapists use several artifacts in their discussion of progress on the collection of active skills. Therapists may analyze these artifacts as a group during the meeting or use them as evidence at a particular point in the discussion.

Traditionally, team meetings, with participation from everyone working with a child and people who have a vested interest in the child, are an integral part of any DTT intervention. The therapists typically meet twice a month to discuss the progress of the child in learning various skills. A consultant who specializes in behavioral analysis and DTT may attend such meetings. The consultant often examines the data collected throughout the week and makes recommendations about the intervention plan. The consultant has little direct interaction with the child, only seeing him/her while testing out a skill during the team meetings. The consultant may ask the therapists to help clarify the data they collected. Based on the numeric data (often visualized as graphs) and input from the therapists, the consultant determines if the child is progressing well with the current path, or whether changes to the program of therapy would be necessary. Typically, one or both parents are present to inform the therapists of any significant behavioral and/or academic issues outside of therapy that may affect the sessions themselves. These issues often included the start of a new treatment, drug, or diet plan as well as reports from school.

DTT is a long-term iterative process, heavily dependent upon the outcome and results of individual sessions for plotting a future course of therapy. Unfortunately, video, audio, and handwritten data is kept on separate media, such as large binders and tapes, making access by individuals and groups wishing to review the results burdensome and impractical. It is especially difficult to assemble and present data for comparison of trends over time between various skills and therapists. Equally difficult is the using the handwritten data and video data together, which is important for visually analyzing the results for particular discrete trials. As a result, the majority of the data that is collected remains unutilized, while therapists and consultants rely largely of their memory and general impression from individual therapy sessions to determine the child's progress.

It would be beneficial to provide a method and computer program product for providing computer supported cooperative care for therapy sessions, enabling consultants and therapists to easily access and analyze data from various therapy sessions in an individual and group setting to evaluate the effectiveness and determine the course of the therapy.

BRIEF SUMMARY OF THE INVENTION

The present invention is directed to a method and computer program product for providing computer supported cooperative care. In particular, the present invention provides a method and review and analysis computer program product for recording, processing, synchronizing, displaying, and providing access to data collected from various media during therapy or interactive sessions.

An exemplary embodiment of the present invention is a method for processing and displaying data from a plurality of media, comprising obtaining handwriting data using an electronic writing instrument, recording video data, synchronizing the video data and the handwriting data, and displaying in a single screen the video data, a timeline of the video data, and handwriting data, the timeline indexed according to discrete periods of time.

An another exemplary embodiment of the present invention is a computer readable medium having computer readable instructions stored thereon for execution by a processor to perform a method for synchronizing, displaying, and providing access to data collected from various media, the method comprising: recording time-stamped video and audio data; obtaining time-stamped handwriting data entries from an electronic writing instrument; synchronizing and indexing the video and audio data with the handwriting data; and displaying in a single screen, a first region comprising the handwriting data, a second region comprising the video and audio data, and a third region comprising a timeline of the video and audio data.

Various embodiments of the present invention are directed to a method and computer program product to support data-based decision-making for teams of caregivers providing Discrete Trial Training therapy (a form of Applied Behavior Analysis or ABA) to children with autism. Autism is a lifelong developmental disability first appearing in young children and is characterized by deficiencies in communication, social skills, and creative and imaginative play. The care of children with autism can especially benefit from support in data-based decision-making, because it is often the case that individuals receiving the care cannot speak for themselves. Additionally, the behaviorists who are central to the treatment of these children are particularly interested in numerical data, especially that which show trends over time. Various embodiments of the present invention use video with automatically-generated indices to quickly access important moments within care sessions, and provide an interface for easily accessing these videos with digitally graphed trend data from care sessions.

A beneficial factor of the various embodiments of the present invention is to increase the accuracy of data collection during therapy sessions and provide therapists with access to more reliable artifacts during meetings. Various embodiments of the present invention capture and index videos of therapy sessions, automatically generate graphs of the child's progress, and provide an interface for quickly accessing these artifacts during their meetings. To minimize changes to the regular practice of the therapy, the various embodiments replace conventional pen and paper used in sessions to record data with paper having a unique pattern and an electronic writing instrument capable of recording the pattern. Various embodiments of the present invention use timing information from the electronic writing instrument and video recording device to approximate time-stamps corresponding to the occurrence of trials in a video stream. This timing information creates highly indexed data that can facilitate navigation on a per-trial basis.

Various embodiments of the present invention comprise an access interface to support individuals or groups in reviewing specific interactions during the therapy sessions. The embodiments provide access to data by displaying graphs for each of the skills on which the child is currently working, either one at a time or overlaid for comparison. For instance, as the user hovers over the data point for any particular day during which that skill was tested, a tool tip displays detailed data from the data sheet about that day. When the user selects one or more data points, a new window appears with the relevant video and the ability to jump easily between the occurrences of tests of the skill of interest. Users can also switch between videos of multiple therapists testing the same skill.

Recorded video from therapy sessions coupled with appropriate indexing allows fast access to particular trials. In current practice, therapists use both a spoken command to indicate the beginning of the trial to the child and a pen to record data after a trial. Various embodiments of the present invention leverage these practices to create effective indices into the recorded therapy session. Using a microphone and voice recognition technology, the review and analysis program can retrieve timestamps for a specific command, obtaining estimates for trial beginnings. After trials, therapists record grades on the augmented datasheet using an electronic writing instrument. Replacing traditional pen and paper with electronic writing instrument technology affords collection of positions and time-stamps of every stroke, while preserving the flexibility inherent to writing.

While capturing a session, the review and analysis program records an additional audio file, which is monitored and indexed while recording, including a pattern file that can be searched for speech patterns indicating the beginning of a trial. For example, within a plain-text XML file generated by the electronic writing instrument's interaction with a data sheet, each stroke is stored with its coordinates and associated timestamp. A stroke, by definition, can contain at least 6 pixels and more than half of its points inside the 31×20-pixel cell the system is analyzing, preventing erroneous marks on the paper made by therapists signaling trial data. Using data stored from the written records and the patterns in the audio, the review and analysis program reconstructs the likely beginning and ending times for particular trials.

The access interface of the review and analysis program provides therapists with the ability to review sessions as well as to correct grades and timestamps for places where technical or human error created incorrect data. Therapists need to perform these tasks both locally at the site of therapy and remotely from their homes or offices in preparation for team meetings and therapy sessions.

The therapist/consultant can choose which session or skill to view by marking a selection from a displayed list. If more than one session or skill is selected the graphs can be overlaid in the same view with a displayed legend. Because multiple graphs might become confusing, other visualization techniques facilitate analysis. A tool tip (describing the target and program) appears each time the cursor is near a plotted line. Another tool tip shows the data from a particular session when the user hovers near that data point.

Users can select multiple sessions for which they want to view more details by clicking and highlighting the columns associated with those sessions. This functionality allows the user to review two different sessions quickly to compare procedures. A session review display browser loads in its own window, with typical video control functions of play, pause, stop, fast forward, and frame seeking functions as well as functions to jump to the next or previous trial of currently visible programs. Along the bottom of the window is a zoomable timeline that shows when trials occurred, using the predictions described above. To the right of the video are the results of particular trials of a selected session or skill. Clicking on a result moves the video to the start time for that trial. If there are several sessions loaded, a user can alternate between them by clicking on the timeline of another video or selecting a trial that is not part of the video currently shown. The grades assigned to a trial, as well as the beginning and end times, can be modified. These corrections appear on the graphs immediately after saving the changes. Within the access interface, therapists can also add and edit programs and targets, an activity that happens frequently during the course of a team meeting.

These and other features as well as advantages, which characterize various exemplary embodiments of the present invention, will be apparent from a reading of the following detailed description and a review of the associated drawings.

BRIEF DESCRIPTION OF THE DRAWINGS

FIG. 2B illustrates a trial form and electronic writing instrument, in accordance with an exemplary embodiment of the present invention.

DETAILED DESCRIPTION OF PREFERRED EMBODIMENTS

Figure 1:
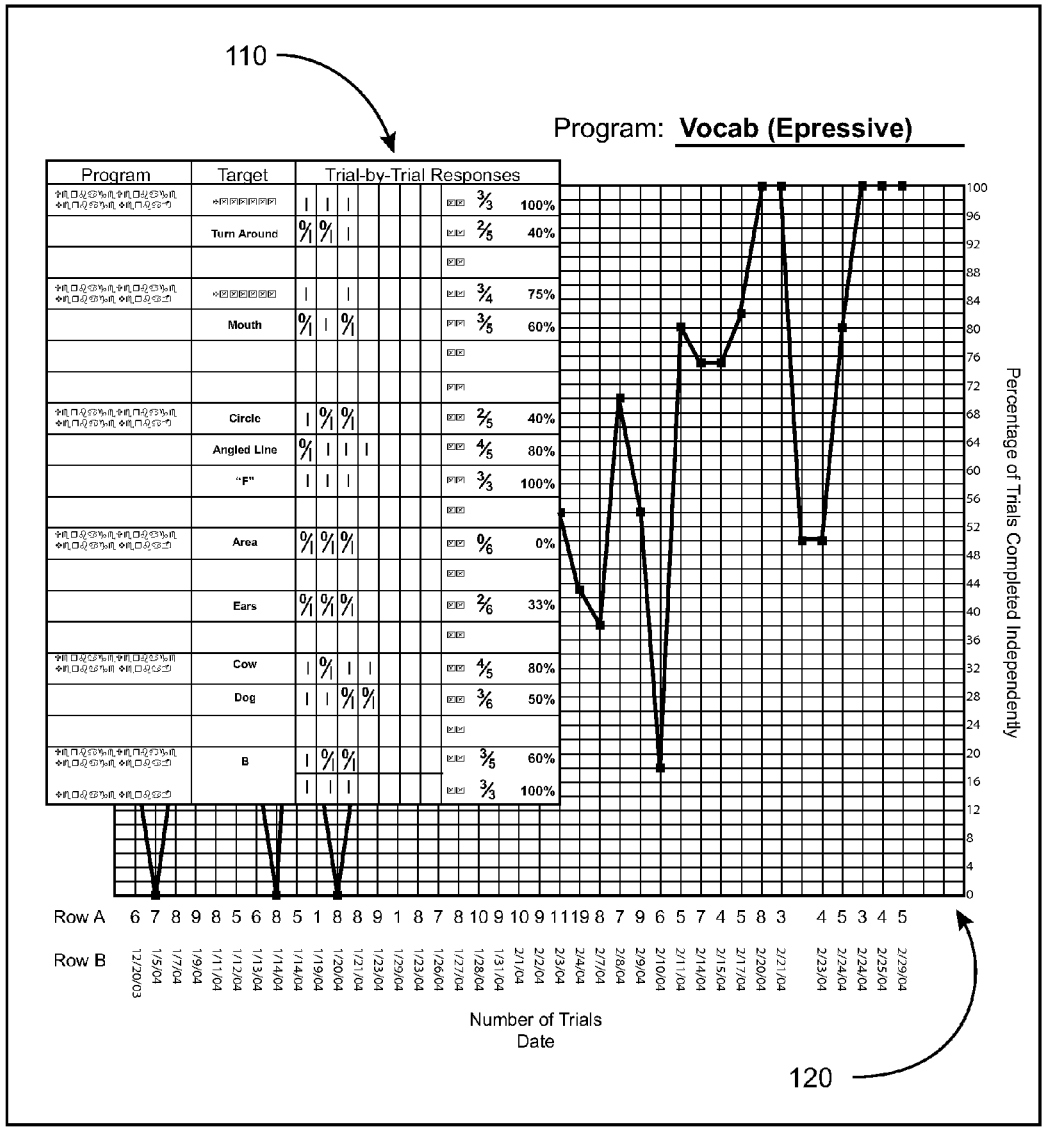
FIG. 1 illustrates a handwritten form and graph form of the prior art used to record and analyze data from therapy sessions.
Figure 2A:
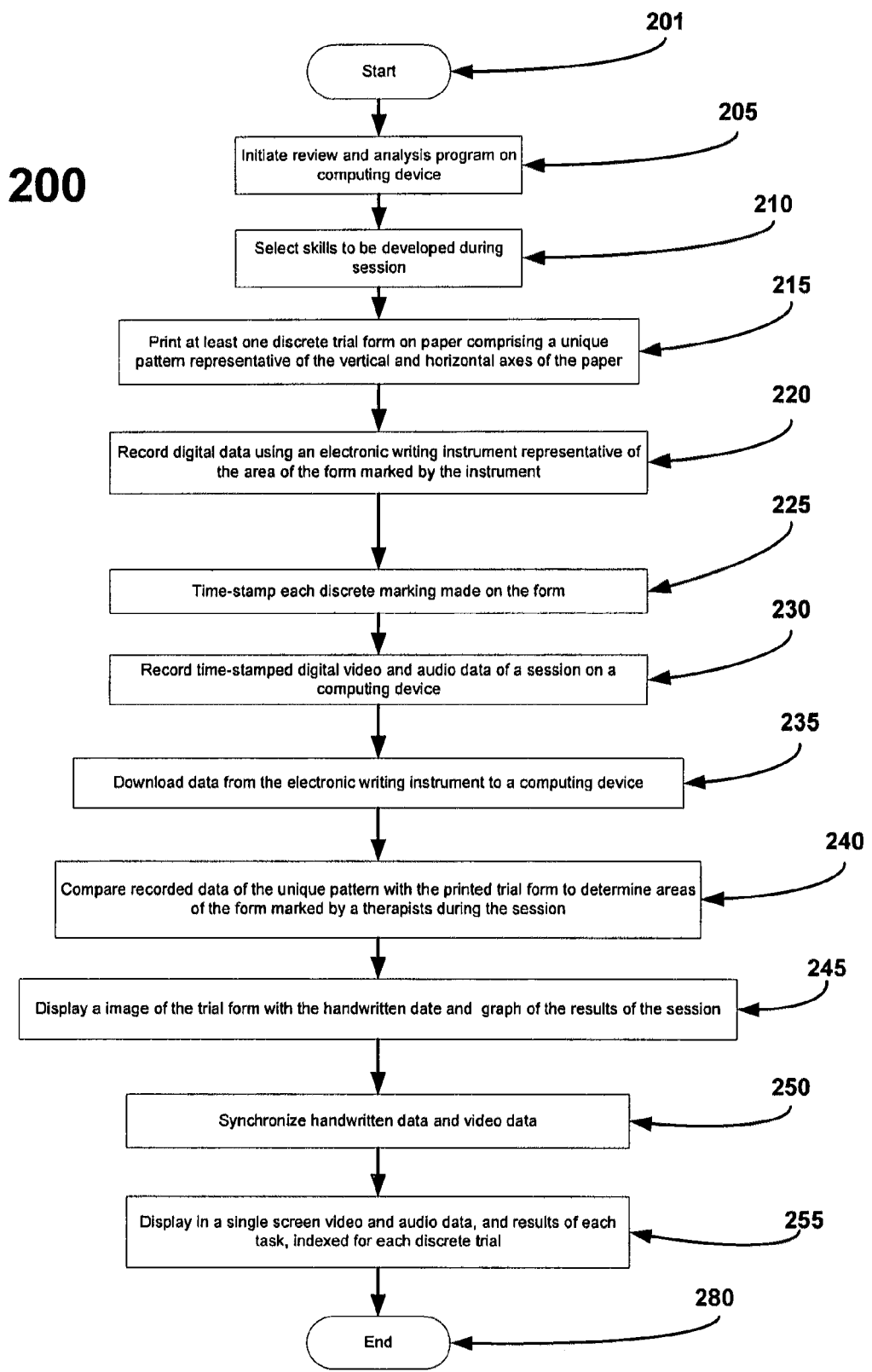
FIG. 2A illustrates a logic flow diagram illustrating a method of conducting and processing data from a therapy session, in accordance with exemplary embodiment of the present invention.

Referring now in detail to the drawing figures, wherein like reference numerals represent like parts throughout the several views, FIG. 2A illustrates a logic flow diagram depicting a method of conducting and processing data from a therapy session 200, in accordance with an exemplary embodiment of the present invention. Processing the data from the therapy session includes recording, synchronizing, displaying, and providing access to the data.

Prior to starting the session at 201, a therapist initiates a review and analysis care program on a computing device at 205. The computing device may be a PC, laptop, tablet PC, PDA, or another suitable programmable electronic device.

One beneficial feature of the review and analysis program enables printing discrete trial forms to be used by the therapist during the session. This is performed by selecting the skills to be developed during a session at 210. The program preferably displays on the screen of the computing device a first drop down box 305 (see FIG. 3B) containing a list of therapist's names, and a second box 306 containing a list of subject names. The therapists may select their name from the first drop down box, and the name of the subject of the particular session to be performed from the second drop down box. The program then preferably populates a first region containing a listing of skills and a second region containing graphical results of the skills. The first region contains a listing of each of the skills that the therapist has previously worked on with the selected subject. By selecting or highlighting one of the skills, a graph is preferably populated in the second region representative of the results of each of the previous sessions during which that particular skill was developed. The therapist may select the skills that will be developed during the present session by checking a box next to each skill located in the first region. The therapist then selects to print at least one discrete trial form 275 (see FIG. 2B) containing tasks for developing the selected skills at 215.

The trial form 275 is preferably printed from a printer attached to or integral with the computing device. The trial form 275 is preferably printed on paper containing a pattern representing the coordinates along the vertical and horizontal axes of the paper. The paper trial form 275 is preferably identical in appearance to conventional forms used in therapy sessions, such as DTT sessions, with the exception of the unique pattern which appears as a light background shading and does not interfere with any features of the form.

The trial form 275 preferably comprises at least one table with rows and columns. A task associated with the skill being developed can be assigned to each row. The columns may provide spaces for recording the results of each discrete trial. The columns may also contain a field for the therapists to enter a symbol indicating the result of the discrete trial. A trial form 275 with fields for entering symbols is advantageous, because it can be designed to be identical to the conventional trial forms used during DTT sessions. A disadvantage with such a form is the reliability of digital recognition of the symbol, which described in more detail below. In other contemplated embodiments, several columns may be used, each representing a possible predetermined result for a trial, enabling the therapist to provide a "check" or "x" in the column representing the result observed during the discrete trial. A disadvantage of such a form is that it is different from the forms presently used by therapists in DTT sessions, and may require retraining to explain its proper usage. An advantage to this form, however, would be increased reliability in digital recognition of the recorded result, also described in detail below.

Using a paper trial form 275 for recording session results rather than an electronic device such as a laptop or PDA is preferable for several reasons. Therapists are presently trained to follow conventional paper forms. The forms are designed to assist the therapists in selecting and reviewing tasks to be performed during sessions. Changing the format and layout of the form may require retraining of the therapists, and would inhibit the seamless integration of the review and analysis program into the DTT system.

Assuming that a trial form identical to conventional forms could be recreated on an electronic device, a paper form would still remain advantageous. Electronic devices require either a battery power source having limited operational life, or must be connected with a power cord to an outlet or power source, which inhibits the therapists mobility. Another disadvantage is the weight of the electronic device, which further limits the therapists' mobility. During a DTT session for example, the therapist must be mobile and be able to follow the child, and should not be anchored by a laptop chord or heavy device. Further, the subjects are accustomed to the presence of paper forms during DTT sessions. The addition of an electronic device may be distracting to the subject, interfering with the performance of the tasks requested of them.

Nevertheless, in other contemplated embodiments, paper trial forms may be replaced with a trial form displayed on electronic media. For example, the therapist may employ a digital copy of the trial form on an electronic clipboard, tablet PC, pocket PC, personal digital assistant (PDA), cellular phone, or another suitable electronic device. Such electronic devices have the advantage of simplifying synchronization of recorded data with other media. The disadvantages of such devices have been discussed above.

The therapist preferably conducts the DTT sessions in the same manner as conventional sessions are performed. The therapist may select a task for the subject to perform, and verbally request that the subject perform the task. For example and not limitation, possible tasks include asking to subject to pick up a pen, point to their nose, or sing a song. The therapist preferably fills out the trial form 275 by hand as the child is verbally asked to perform various task related to the skills being developed. In the appropriate location on the form, the therapist indicates the result of the discrete trial. For example, the therapist may indicate that the subject successfully performed the task on a first attempt, performed the task on a second attempt, failed to perform the task, or the therapist may record another appropriate result.

Figure 2B:
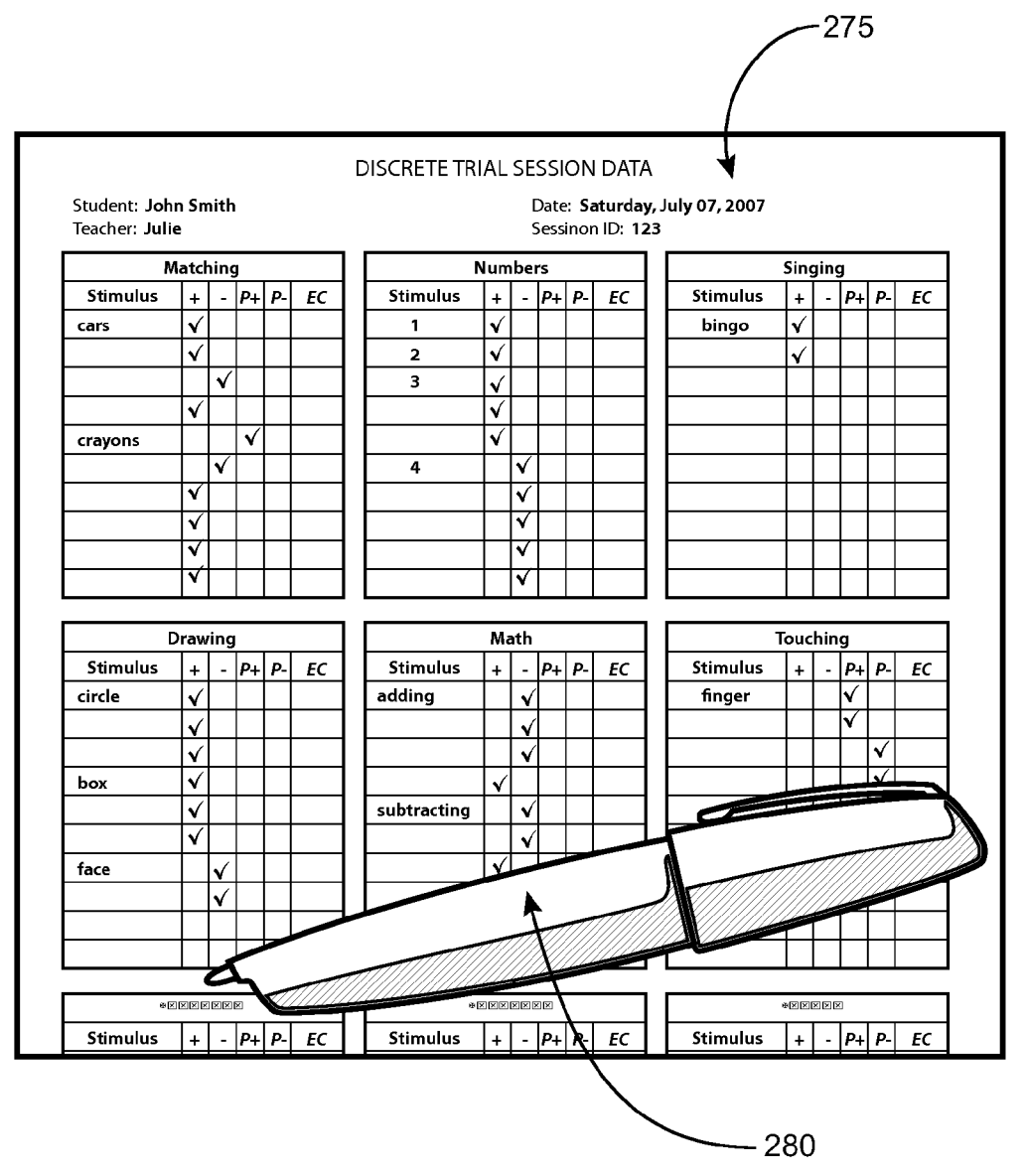

The therapist preferably fills the form out with an electronic writing instrument 280 (see FIG. 2B) capable marking the paper trial form 275 with ink and of recording the unique pattern on the paper in the area being marked with ink. FIG. 2B illustrates a paper trial form 275 and electronic writing instrument 280, in accordance with an exemplary embodiment of the present invention. Use of the trial form 275 containing a unique pattern and electronic writing instrument 280 enables recording digital data representative of the area of the form marked by the therapist at 220. The electronic writing instrument 280 preferably contains an optical receiver, which records a digital image of the unique pattern on the paper trial form 275 of the area being marked by the therapist. The optical receiver preferably records the pattern by detecting the ambient light reflected by the unique pattern on the paper. In an alternative contemplated embodiment of the present invention, the electronic writing instrument 280 may contain its own light source for generating light that is reflected by the unique pattern on the paper and detected by the optical receiver. For example, the electronic writing instrument 280 may include a laser, LED, or other suitable light source. The electronic writing instrument 280 preferably comprises internal memory for storing the detected pattern, so that it may later be downloaded to a computing device. The electronic writing instrument 280 preferably contains an internal clock enabling time-stamping each of the discrete markings made by the therapist at 225. The time-stamp enables recording the exact time at which a therapist recorded the result of a discrete trial.

At 230, conducting the DTT session also preferably includes recording time-stamped video and audio data of the session. Video of the session is preferably recorded by a wall-mounted camera in communication with the computing device. In a preferred embodiment, the camera or video recorded simultaneously records audio and video images. In alternative embodiments, any electronic device capable of recording video images and communication with a computing device may be employed. For example, a webcam in communication with the computing device could be used. In other contemplated embodiments of the present invention, audio data of the session is preferably recorded directly on the computing device from a microphone separate from the device recording video images. The microphone may be worn by the user and in wireless communication with the computing device, free standing, placed on a table top, or integral with the computing device.

In other contemplated embodiments of the present invention, various detectors and sensors may be employed to record different data parameters. For example, sensors couple be used to detect physiological parameters of the subject such as an electromyograph to detect muscle activity, electroencephalograph to detect brain activity, pulse rate monitor, a thermometer, galvanic skin response monitor, electrocardiograph to detect cardiac activity, a photoplethysmograph to detect blood pressure, a infrared camera to measure body temperature, or another suitable sensor or monitor to detect a parameter of interest. Such sensors and monitors would preferably be wireless and/or designed to be minimally intrusive to the subject to not interfere with the DTT session.

Once the DTT session has completed, audio and video recording may be terminated. The therapist preferably selects a feature in the review and analysis program indicating that the session has been terminated. The computing device then automatically ceases the recordation of audio, visual, or other data, and preferably shuts down the devices collecting such data.

At 235, the electronic writing instrument is then preferably connected to the computing device and data recorded by the instrument is downloaded onto the computing device. Connecting the electronic writing instrument preferably comprises inserting the instrument into a docking station in electronic communication with the computing device. In other contemplated embodiments of the present invention, the writing instrument may comprise a port for connecting to the computing device. In further embodiments, the writing instrument may comprise a wireless transceiver, such as Bluetooth, 802.11b, 802.11g, infrared, and the like, for communicating with the computing device.

The review and analysis program preferably automatically accesses the video, audio, and handwriting stored on the computing device. The program processes the handwriting data from the electronic writing instrument 280 to determine the results of each discrete time trial entered by the therapist. At 240, the program preferably compares the recorded data of the unique pattern associated with each marking to the printed trial form 275 to determine the areas of the form marked by the therapist. This process is described in greater detail below with regard to the computer program product. At 245, the program preferably displays a representation of the trial form 275 with the markings made by the therapist during the session on the paper trial form 275, and automatically graphs a chart of the results of each of the tasks performed during the session according to data downloaded from the electronic writing instrument. At 250, the program may also preferably automatically synchronize each of the discrete markings made on the trial form 275 with the video and audio recording corresponding to the particular discrete trial of that task. This is enabled by the time-stamps embedded within the video, audio, and handwriting data.

At 255, to assist in accessing the recorded data, the review and analysis program preferably displays in a single screen video and audio data of the entire session, and results of each task, indexed by each discrete trial 280. The program displays the data in at least three distinct regions. In the first region the program displays video data recorded during the DTT session. In the second region the program displays the results of the individual task performed during the DTT session. In the third region the program displays a timeline of the DTT session. The results in the second region are synchronized with the video in the second region, such that by selecting or highlighting a particular result of a task, video recorded during the selected task is displayed in the second region. Further, audio recorded during the task is played concurrently with the video. The display and indexing of data recorded during the DTT session is described in greater detail with regard to the review and analysis computer program product below.

Displaying and indexing data recorded during the DTT session simplifies the review process of the data immediately after the session, as well as in the future. More importantly, it enables review of the data in a group setting. The results from each DTT session are preferably stored on the computing device and can easily be organized, referenced, and compared. Further, the video from each session is also preferably stored on the computing device also. By selecting a single DTT session, the results of the session as well as video and audio recorded during that session can be quickly accessed. An advantageous feature of the program is the indexing of the trial results recorded by the therapist with the video of the session. By selecting a particular trial result, the video of that task is preferably automatically played. This is a substantial improvement over present methods, which require forwarding and rewinding through a recorded video to find a particular trial. The computing device may also be connected to a projector. This enables the results and video displayed by the review and analysis program to be reviewed by a large groups of individuals. By simplifying the review process, the present method better utilizes the results and data of a DTT session, enabling for better decision making and diagnosis, improving the effectiveness of the treatment.

The embodiment of the method discussed above relates particularly to employing the method to conduct and process data from a therapy session, in particular capturing, processing, synchronizing, and providing access to data from a DTT session. In other contemplated embodiments, the method can by applied to a variety of interactive sessions during which media is recorded. For example, the method could be employed in a hospital, educational, clinical, or research setting. In general, the method could be applied in any various settings, in which recording data from various media during a discrete time period and synchronizing the data for later review is desirable.

Figure 3A:
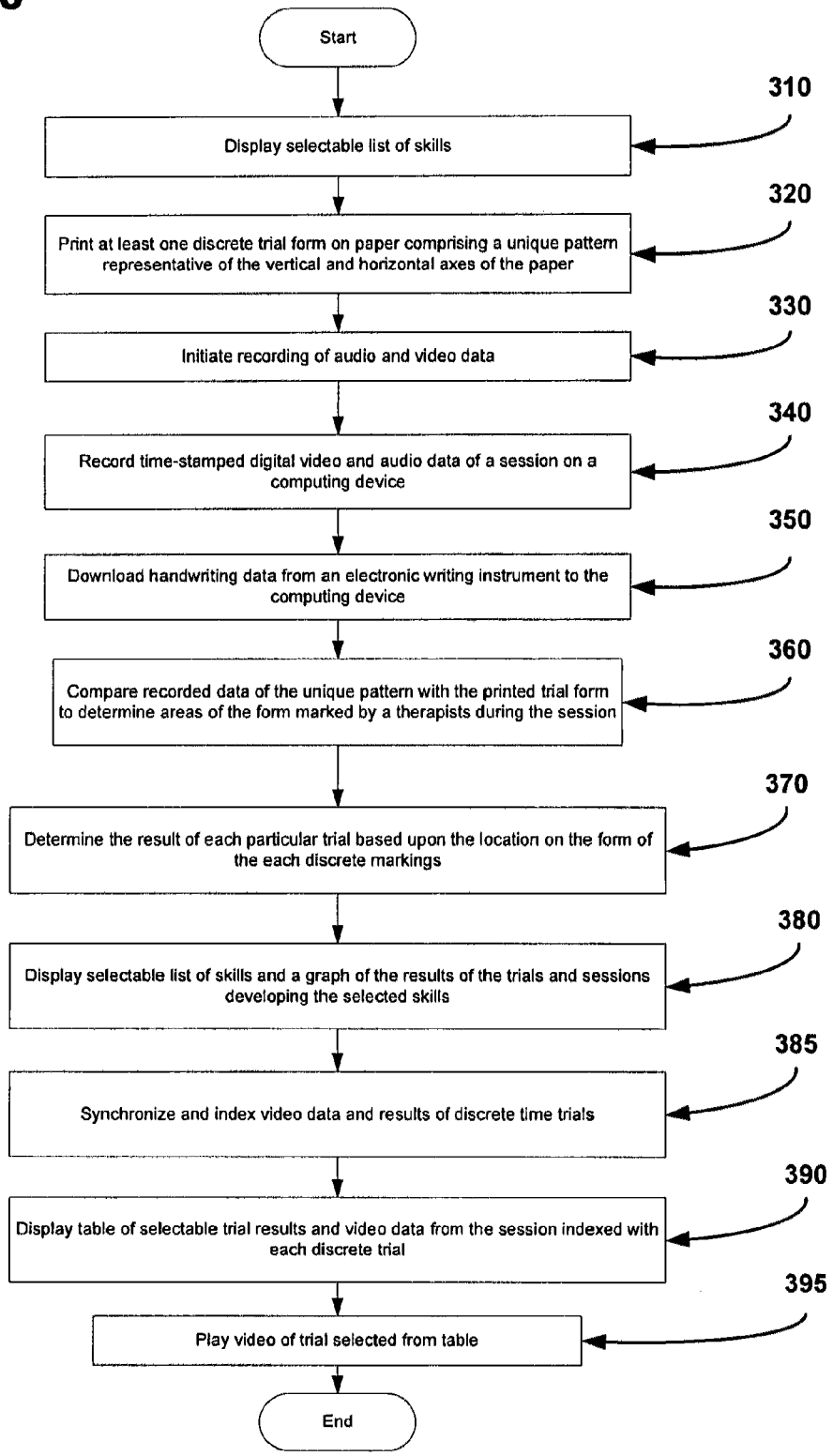
FIG. 3A illustrates a logic flow diagram for a computer program product for processing data from a therapy session, in accordance with an exemplary embodiment of the present invention.

FIG. 3A illustrates a logic flow diagram for a computer program product for processing data from a therapy session 300, in accordance with an exemplary embodiment of the present invention. In a preferred embodiment, the program product is a review and analysis care program for data collected during a plurality of DTT sessions. The review and analysis program is preferably stored and executed on a computing device as discussed above. The review and analysis program preferably operates in a Microsoft Windows operating system, although it can operate in other operating systems. The review and analysis program preferably has a visual interface allowing the user to access and select features, and input data using a standard keyboard and mouse.

The review and analysis program receives data from a plurality of media recorded during a DTT session. The program processes and synchronizes the data so that it may easily be accessed by one or more therapists after the session for review purposes. The program also stores and catalogues data from a plurality of separate DTT sessions. This enables data from multiple sessions conducted by different therapists to be review, analyzed, and compared simultaneously.

Figure 3B:
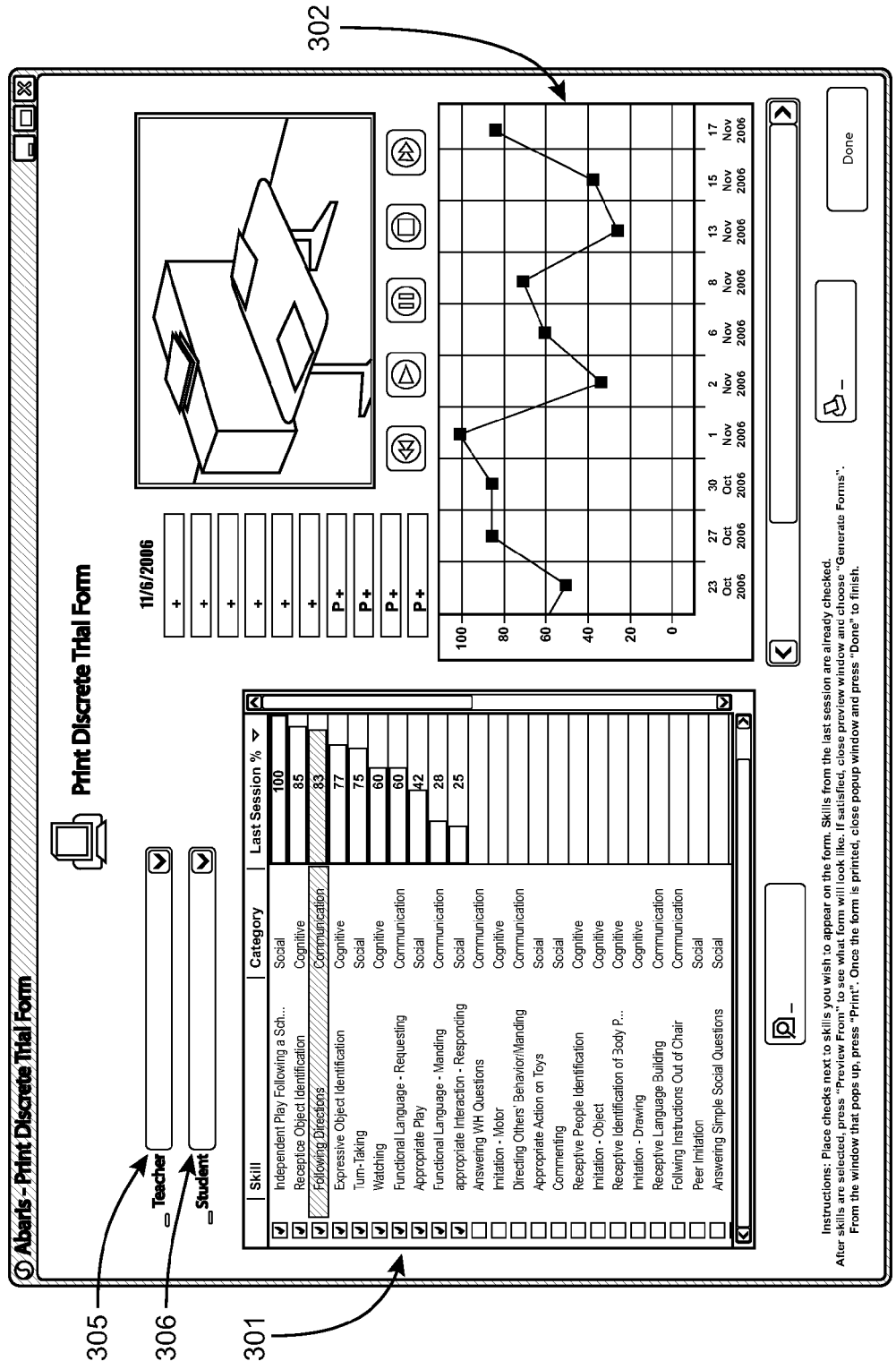
FIG. 3B illustrates a screenshot of a display of the computer program product for preparing a trial form for a therapy session, in accordance with an exemplary embodiment of the present invention.

Review and analysis program enables printing discrete trial forms to be used by the therapist during a therapy session, such as a DTT session. The program displays on the screen of the computing device a first drop down box 305 (see FIG. 3B) containing a list of therapists names, and a second box 306 containing a list of subject names. The therapists may select their name from the first drop down box and the name of the subject of the particular DTT session to be performed from the second drop down box. At 310, the program then populates and displays a first region containing a selectable listing of skills 301 (see FIG. 3B) and a second region for displaying graphical results of the skills 302. The first region contains a listing of each of the skills that the therapists has previously worked on with the selected subject. By selecting or highlighting one of the skills, a graph is populated in the second region representative of the results of each of the previous sessions during which that particular skill was developed. FIG. 3B illustrates a screenshot of a display of the computer program product for preparing a trial form 275 for a DTT session according to an embodiment of the present invention. The therapist may select the skills that will be developed during the present session by selecting a box next to each skill located in the first region. The therapist preferably selects to print at least one discrete trial form 275 containing tasks for developing the selected skills.

Figure 3C:
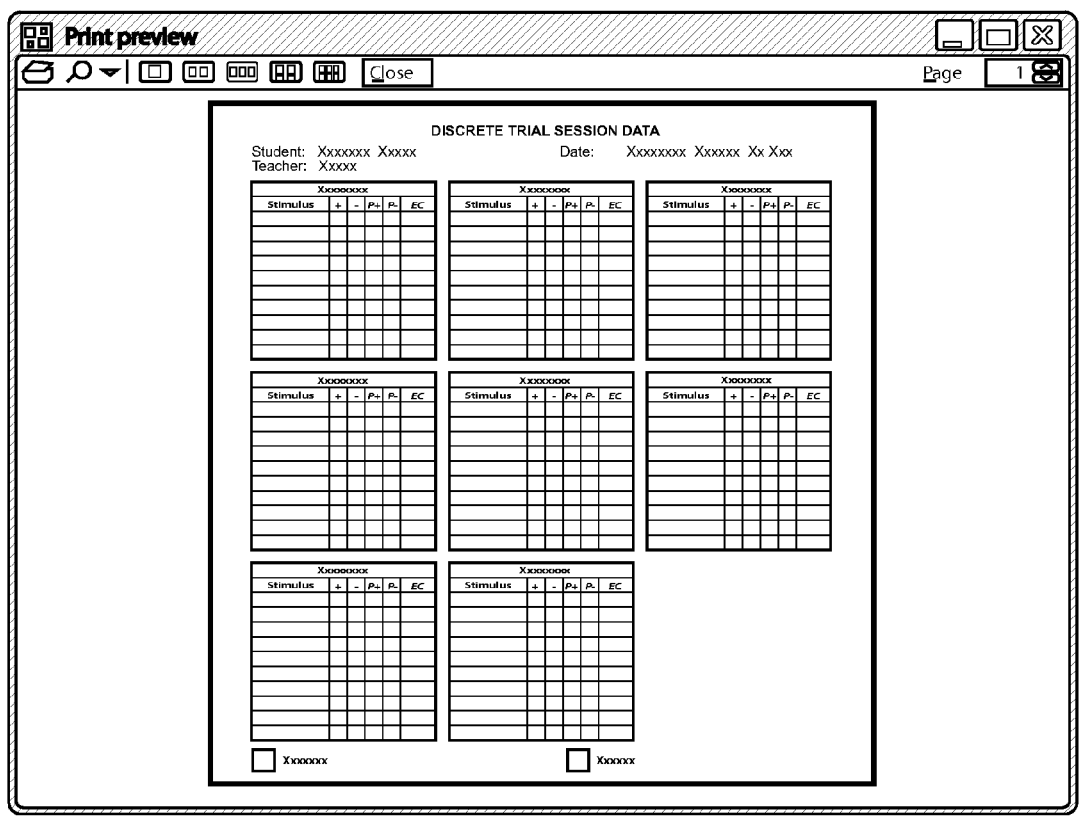
FIG. 3C illustrates a screenshot of a preview of a trial form of the computer program product, in accordance with an exemplary embodiment of the present invention.

From the skills selected by the therapist, the review and analysis program preferably generates and displays a representation of the trial form 275 the may be used in the DTT session. FIG. 3C illustrates a screenshot of a preview of a trial form 275 generated by the computer program product according to an embodiment of the present invention. The format and layout of the trial form 275 is preferably substantially identical to the trial forms conventionally used during DTT sessions. The therapist may select to print the trial form 275 through an attached or integral printer. At 320, the review and analysis program preferably generates and prints an image of the trial form 275 with a unique pattern on a standard sheet of paper. The unique pattern is preferably representative of the vertical and horizontal axis of the paper, and is visible as a background shading, which does not interfere with the use of the form. The review and analysis program preferably stores the unique pattern such that each portion of the pattern may be associated with the vertical and horizontal coordinates of the paper. The review and analysis program also preferably stores the layout of the trial form 275 such that it may also be associated with the vertical and horizontal coordinate of the paper.

Once the form has been printed, the therapist may begin the DTT session. The therapist may indicate the start of the DTT session by clicking a displayed start button. At 330, once the DTT session has been started, the program preferably initiates recording of audio and video data through the drivers installed on the computing device and peripheral devices connected to the computing device. At 340, the video and audio data is preferably recorded, time-stamped, and stored on the computing device by the review and analysis program. Video data is preferably captured through a video camera or other video recording device. Audio data is preferably captured through a microphone, as discussed in detail above. In other contemplated embodiments of the present invention, the video and audio data may be recorded with a single device. In further embodiments of the invention, recording of video and audio data may be accomplished by devices that are not in communication with the computing device, and therefore initiated manually by the therapist rather than by the review and analysis program.

During the DTT session, the therapist records the results of the task being performed by the subject of the trial form 275 using an electronic writing instrument 280 as discussed above. The electronic writing instrument 280 preferably contains an internal clock. As data of each discrete marking is recorded and stored by the electronic writing instrument 280, the data is time-stamped. This allows the marking data to later be synchronized with audio and visual data. The electronic writing instrument 280 preferably synchronizes its internal clock each time the instrument 280 is docked or otherwise connected to the computing device. At the conclusion of the DTT session, the therapist preferably terminates the recording of data by clicking a stop session button displayed by the review and analysis program. At 350, the electronic writing instrument 280 is then preferably connected to the computing device and the stored handwriting data is downloaded to the computing device by the review and analysis program. In a preferred embodiment, the electronic writing instrument 280 is inserted into a docking, station which is in electronic communication with the computing device. The review and analysis programs preferably automatically initiates download of data store in the electronic writing instrument 280 to the computing device and stores the data in the computing device. The program preferably automatically accesses the data for processing.

The electronic writing instrument 280 preferably records data of the unique pattern and stores it in an XML format. Once this data is downloaded onto the computing device, the review and analysis program accesses and processes the data. Processing the data includes comparing the stored image of the trial form 275 with the data of the unique pattern recorded by the electronic writing instrument. At 360, the program compares the unique pattern recorded for each discrete marking with the portion of the form associated with that particular unique pattern to determine where on the form the therapist was marking.

In a preferred embodiment, the trial form 275 comprises separate columns for recording the results of each discrete trial. Therefore, once the program determines in which column the therapist made a marking, the program can derive the result of that particular trial. For example, if the therapist made a mark in the first column of the row associated with the task of picking up a pen, the program can determine that the result of the task was the predetermined result assigned to be represented by the first column. The trial form 275 preferably comprises a plurality of columns, each representing one of the conventional standard results for a task, such as "completed on first try", "completed on second try", "failed to complete", etc. At 370, using this information, the review and analysis program determines the result of each particular trial based upon the location on the form of the markings made by the therapist. The therapist may make several markings in a particular row, crossing or scratching out their initial result and writing a new one. For example, if a therapist unintentionally checks the incorrect column, that marking can simply be crossed out and a marking made in the correct column. The program is preferably capable of only processing the last in time marking made in each particular row. This is enabled by the time-stamp that is recorded with each discrete marking.

In an alternative contemplated embodiment of the present invention, the trial form 275 preferably comprises a single column for recording the result of a discrete task. The therapist preferably records the result of the trial by marking a symbol in the column such as a letter or numeral corresponding to a predetermined result. In processing the recorded data, the program preferably is capable of recognizing the symbol marked by the therapist and deriving the result for the task therefrom. An advantage to this embodiment is that it employs the form layout that is presently used in DTT sessions. A disadvantage is that recognizing a hand drawn symbol from markings on the unique pattern is less reliable than simply recognizing the portion of the paper on which the markings were made. Further, it does not enable the therapists to change the recorded result or make corrections.

Once the handwriting data from the electronic writing instrument has been processed and the results of each trial have been derived, the program creates a file comprising this processed data and stores it on the computing device. This stored data comprises information regarding the task and result represented by each discrete marking and the time at which it was recorded.

Figure 4:
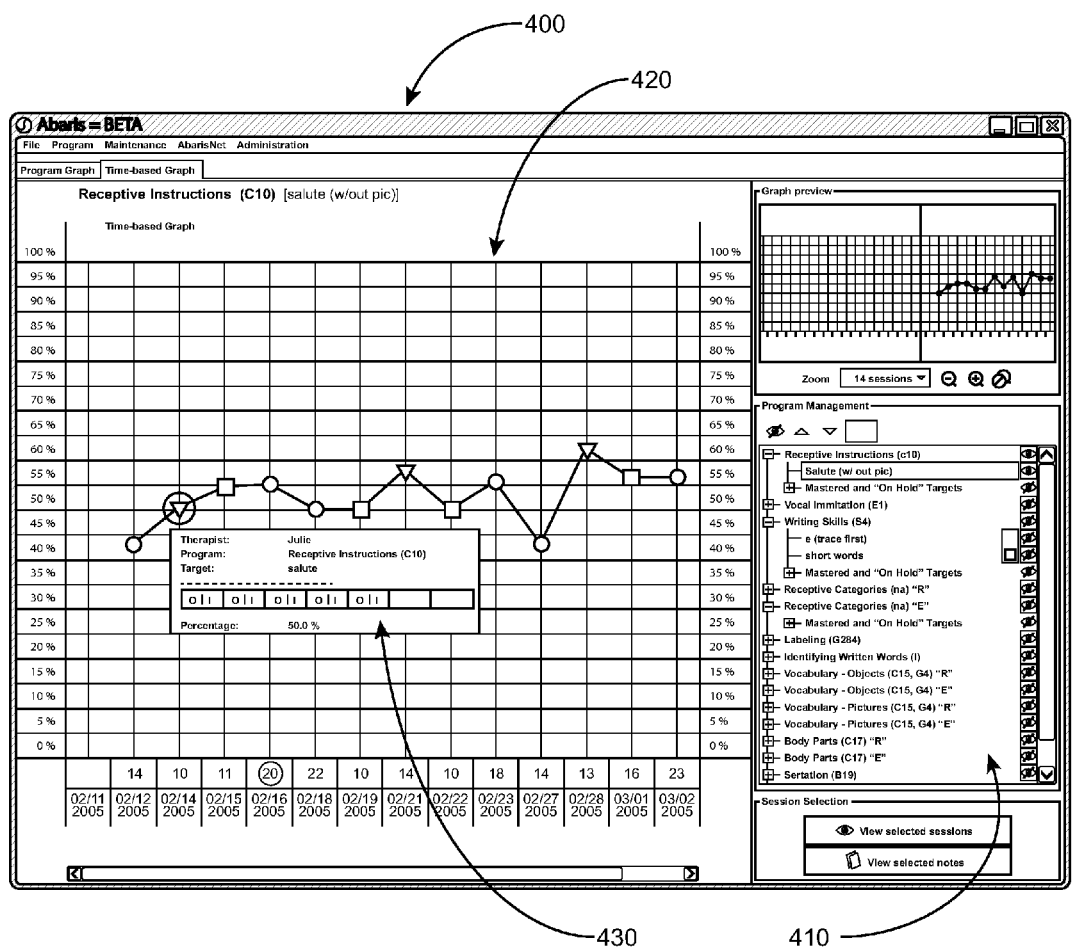
FIG. 4 illustrates a screenshot of a main session view interface of the computer program product, in accordance with an exemplary embodiment of the present invention.

The therapist preferably reviews the data from the completed DTT session and previous sessions by selecting a feature within the review and analysis program. FIG. 4 illustrates a screenshot of the main session data review interface 400 for a particular subject. In the interface 400 the program preferably displays a skill region 410 comprising a listing of each of the skills that the subject has developed. Preferably, within the list are expandable and collapsible sub lists of each of the tasks performed in developing that particular skill. When a particular task is selected, the review and analysis program preferably populates and displays a graph in a graph region 420 representing results of the discrete trials of the selected task from each DTT session during which trials of the task were performed at 380. The horizontal axis is preferably a chronological timeline of the sessions developing the selected skill and the vertical axis is preferably representative of the average score of each of the trials. Each discrete plot on the graph preferably represents the average results of trials for a particular task recorded during a DTT session.

Multiple tasks may be selected from the skill list in the skill region 410 and displayed simultaneously in the graph region 420. The therapist or reviewer may scroll over a discrete plot on the graph with the mouse cursor to obtain relevant information regarding the DTT session. A popup window 430 is preferably displayed in the graph region 420 comprising information related to therapist conducting the session skill being tests and the recorded results. The results may be displayed as a percentage and in tabular form as recorded by the therapist.

The main session data review interface 400 enables therapists, counselors, consultants, and other professionals to easily review a subject's results for various tasks, track the development of skills, compare results with different therapists, and determine trends throughout the therapy. In conventional DTT therapy, such analysis would be cumbersome and impractical, if not entirely impossible. The skill region 410 enables the sorting, cataloging, and accessing of large amounts of data according to skills and tasks throughout the course of the therapy session. The graph region 420 enables a review and comparison of the results of individual DTT session as well as monitoring progress over time. Perhaps the most useful data for analyzing the effectiveness of a DTT therapy, however, is detailed information of each individual trial, in particular the responsiveness of the child to particular requested tasks. A detailed analysis of each DTT session is enabled by another feature of the review and analysis program.

Figure 5:
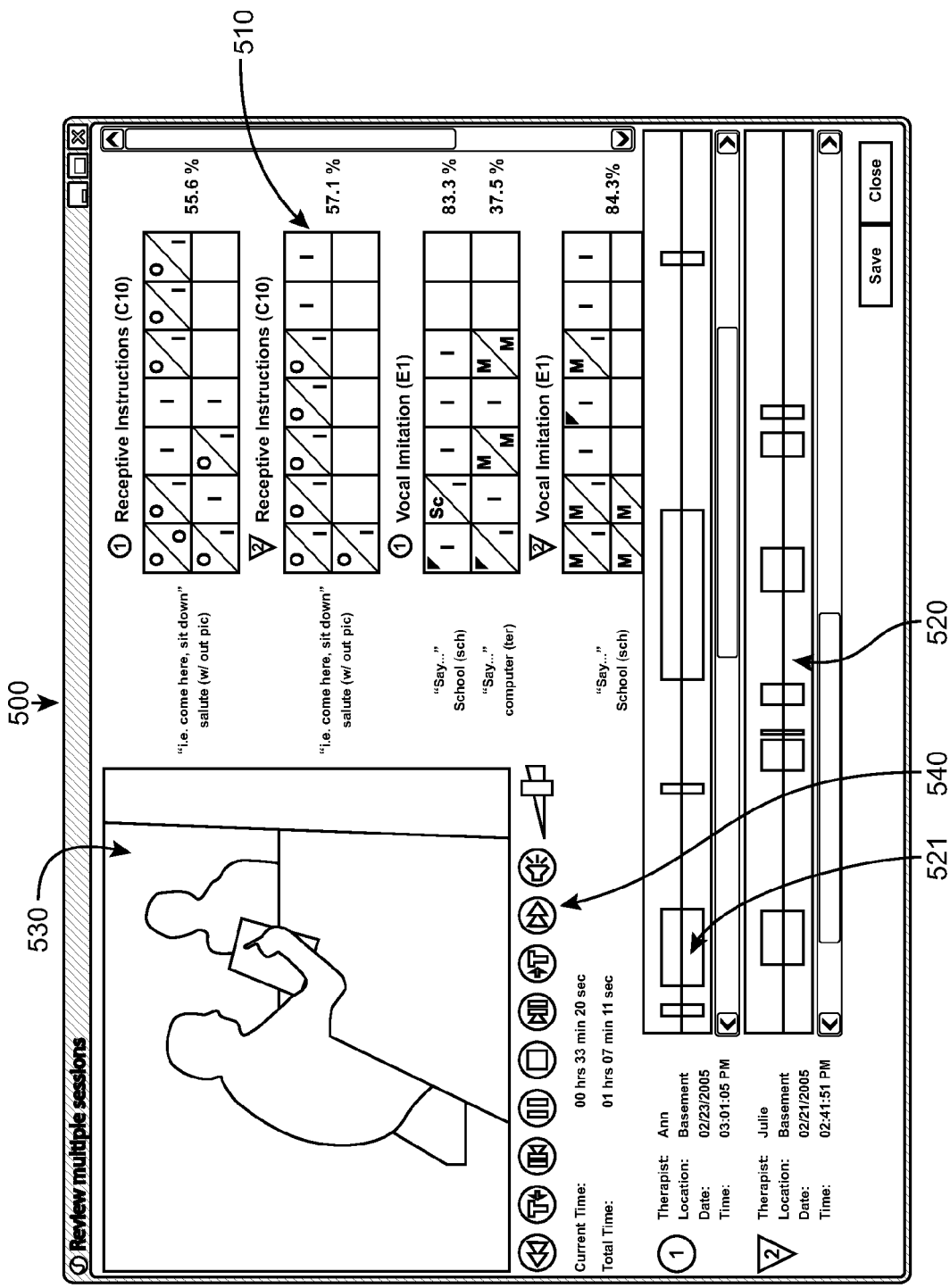
FIG. 5 illustrates a screenshot of a detailed session view interface of the computer program product, in accordance with an exemplary embodiment of the present invention.

FIG. 5 illustrates a screenshot of a detailed session view interface 500 displayed by the review and analysis program on a computing device according to an exemplary embodiment of the present invention. The session view interface 500 preferably displays the detailed results and data recorded during at least one DTT session. In a preferred embodiment, the session view interface is preferably capable of displaying data from six DTT sessions. The DTT sessions displayed in the session view interface 500 may be DTT sessions conducted by different therapists. This enables comparing results, effectiveness, performance, techniques, and responsiveness of the subject to the different therapists conducting the DTT sessions.

The session view interface 500 preferably displays in a single screen a table of selectable trial results and video data from the session indexed with each discrete trial at 390. The session view interface 500 preferably comprises a trial result view region 510. Results of the each trial are displayed in the result view region 510 preferably in tabular form. The tables displaying the results are preferably substantially similar to the tables of the trial form 275 that was filled out while the session was recorded. The results are preferably displayed in the tables as symbols similar to those used in conventionally DTT sessions to designate a result. This enables the individual reviewing the data to easily interface with a familiar format.

The session view interface 500 preferably further comprises a video timeline region 520. The video timeline region 520 comprises timelines of the video data recorded during each of the DTT sessions being displayed. The review and analysis program preferably synchronizes the video data with the recorded results of the task. As previously mentioned, the video audio and recorded data are all preferably time-stamped. Preferably, the devices recording each of the data have synchronized internal clocks or are other set to the same time by the computing device or other means. The purpose of synchronizing the video data with the recorded data is so that video of the subject performing a particular task can be easily accessed and reviewed.

The review and analysis program preferably synchronizes and indexes the video data with the handwriting data for the result of each discrete trial at 385. According to preferred exemplary embodiment of the present invention, the video data may be directly synchronized with the handwriting data of the results of each trial. For example, if the time stamp for a discrete marking representing the result of a task is 4:13:35 pm, the review and analysis program may associate the trial result with a portion of the video data beginning at a predetermined before the time-stamp. This is preferably accomplished using a predetermined average amount of time needed to complete a trial and record the result. For example, the average amount of elapsed time from the therapist prompting the subject to perform a task and the therapist recording the result may be 30 seconds. In such an instance, the program may associate a result derived from a discrete marking time-stamped at 4:13:35 pm with a segment of the video starting at 4:13:05 pm and ending at 4:13:35 pm. The average predetermined amount of time to complete a trial preferably varies depending upon the task being performed. For example, a task requiring a subject to point to a pen may require less time to complete than a task require the subject to sing a song or recite the alphabet.

According to an alternative exemplary embodiment of the present invention, the video data may be synchronized using separately recorded audio data. Synchronizing the video data using audio is preferably accomplished by employing voice recognition. The review and analysis program preferably processes the recorded audio data and determines the beginning of a task from the words spoken by the therapist. For example, the program would analyze the portion of audio data representing the therapist speaking the words "point to the pen" as the beginning of particular task. The beginning of the task would be then determined by the time-stamp associated with that portion of the audio data. The completion of the particular task would preferably be preferably indicated by the recorded data immediately following the recognized verbal prompt initiating the task. The audio and recorded data time stamps would be used for associating a beginning and end of a segment of the video data representing the task being performed. The audio data used for analysis may be audio data recorded by the device recording the video data, such as a camcorder with a microphone, or from a separate audio recording device as described above. An advantage to using voice recognition for synchronizing data is that is does not rely on a predetermined average time of task, which may be shorter of substantially longer than the actual task that was performed. A disadvantage to the voice recognition is that it is not always reliable and depends upon how the therapist prompts the subject, quality of audio data, and can be affected inflection, tone, and accent of the therapist.

The video timeline region 520 preferably visually displays the video data synchronized and indexed with the handwriting data for the result of each trial. The trial segment 521 may represent a portion of the video timeline during which a particular trial is being performed. This trial segment 521 can be positioned on the timeline of the video data based upon one of the synchronization techniques described above.

The session view interface further preferably comprises a video display region 530. The video display region 530 is preferably capable of displaying video data recorded during a DTT session. Preferably, below the video display region is a video control toolbar 540. The toolbar 540 preferably includes features for reviewing video data such as start, stop, pause, rewind, and fast forward displayed as selectable buttons. The toolbar 540 also can include a button that allows the user to skip between trials that have been recorded by the video data. This is enabled by synchronizing the video data with the handwriting data for the result of each discrete trial. By pressing a next trial button, the video display region 530 automatically displays the next trial segment 521 in the video timeline. The toolbar 540 preferably also includes a previous trial button. This enables the reviewer of the data to easily and selectively view only the portion of the video that contain a trial being performed by the subject.

The result region 510 is also preferably associated with the video display region 530 and video timeline region 520. At 395, the reviewer may select a the result of a particular task in the table of the result view region 520, and the segment of the video data associated with that discrete task can be automatically displayed in the video display region 530. This enables the reviewer to select a desired discrete trial performed by the subject, based upon the result of the trial, and view the video data recorded during the execution of the trial.

The features of the review and analysis program described above features provide a variety of advantages over conventional methods of collecting, storing, and reviewing data from DTT therapy. As previously mentioned, traditionally recorded data from DTT sessions is stored in large paper binders and video data is stored separately on video tapes or files on a computer. The video and recorded data is unindexed and reviewing both handwritten data and video data simultaneously is a difficult, time consuming process. As a result, much of the recorded and video data is not used in post session determinations of the effectiveness of the therapy.

The review and analysis program preferably stores, indexes, organizes, catalogs, synchronizes, and displays recorded and video data from DTT sessions. The program enables a reviewer, such as a therapist or consultant, to easily access data from the DTT session based on numerous criteria. The program further enables the reviewer to simultaneously view and analyze video and recorded data from multiple DTT sessions. The program greatly improves utilization of data recorded during the DTT sessions, providing of greater analysis of progress and trends in the therapy, enabling more informed decision making regarding the course of the therapy.

Since all of the data is stored on a computing device, it can easily be accessed by multiple reviewers. Several reviewers may access the data on a single computing device, or a projector may be connected to the device enabling even larger groups to view the data. Further, since all of the data has been stored digitally, it can easily be transmitted to reviewers in remote locations who can access the data provided they have a copy of the review and analysis program. As previously discussed, an important aspect of DTT therapy is the group based decision making regarding the course of the therapy. The review and analysis program enables greater access to more data than conventional methods, substantially improving the ability of a group of reviewers to review and analyze data to reach a decision regarding the therapy.

The embodiments of the review and analysis program described above relate particularly to applying the program to assist with DTT therapy. The contemplated embodiments are not limited to DTT therapy. The program could be readily applied for other forms of clinical and medial therapy and observation. In further contemplated embodiments, the program can be used in a broad range of application to receive, process, synchronize, display data from a plurality of media recorded during a variety of discrete time periods. For example, the program may be employed in research, security, surveillance, law enforcement, medical diagnostics, educational, industrial, and other applications, which require or may benefit from time synchronization and access to data from a plurality of media.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

What is claimed is:

1. A method for processing and displaying data from a plurality of media used during a session, comprising:
    obtaining handwriting data using an electronic writing instrument, wherein the handwriting data comprises a handwriting time-stamp recorded during the session;
    recording video data, wherein the video data comprises a video time-stamp recorded during the session;
    synchronizing the video data and the handwriting data;
    displaying in a single screen the video data, a timeline of the video data, and handwriting data, the timeline of the video data being indexed according to discrete periods of time;
    initiating a program on a computing device;
    selecting faculties to be developed;
    printing at least one form comprising a list of tasks designed to develop at least one selected faculty, and a unique pattern representative of the vertical and horizontal coordinates of the paper;
    performing separate exercises of each task during the session;
    writing a result for each exercise on the form using the electronic writing instrument; and
    recording video data comprising recording video of a subject performing each task;
    wherein displaying the timeline of the video data comprises displaying a discrete segment on the timeline representative of the video data of the subject performing a discrete task.

2. The method of claim 1,
    wherein obtaining handwriting data comprises using the electronic writing instrument to record data of the unique pattern of the area of the paper marked by the electronic writing instrument.

3. The method of claim 1, further comprising:
    time-stamping each marking made on the form using the electronic writing instrument; and
    time-stamping the video data recorded during the session.

4. The method of claim 1, further comprising:
    storing an image of the printed form;
    comparing the handwriting data with the stored image of the form to determine the marked areas of the form; and
    determining the result of each separate exercise by analyzing the marked area of the form.

5. The method of claim 3, further comprising:
    synchronizing the video and handwriting data using the time-stamps of the video and handwriting data and a predetermined amount of time necessary to execute each task performed during the session.

6. The method of claim 1, further comprising displaying the handwriting data in a table having a layout corresponding to the form, each discrete handwriting data entry separately displayed as a symbol representative of the symbol recorded on the form during the session.

7. The method of claim 1, further comprising:
    downloading the video data and handwriting data to the computing device; and
    displaying in a single screen the video and handwriting data, indexed according to separate exercises conducted during a session.

8. The method of claim 1, further comprising:
    recording separate audio data; and
    synchronizing the video data and handwriting data comprising using voice recognition to associate the handwriting data with portions of the video data.

9. A non-transitory computer readable medium having computer readable instructions stored thereon for execution by a processor to perform a method for synchronizing, displaying, and providing access to data collected from various media used during a session comprising:
    recording time-stamped video and audio data;
    obtaining time-stamped handwriting data entries from an electronic writing instrument, wherein the handwriting data comprises a handwriting time-stamp recorded during the session;
    synchronizing and indexing the video and audio data with the handwriting data;
    displaying in a single screen, a first region comprising the handwriting data, a second region comprising the video and audio data, and a third region comprising a first timeline of the video and audio data;
    simultaneously displaying video for a separate session; and
    simultaneously displaying in a third region at least two timelines, including the first timeline, each representative of video data recorded during the separate sessions.

10. A non-transitory computer readable medium having computer readable instructions stored thereon for execution by a processor to perform a method for synchronizing, displaying, and providing access to data collected from various media used during a session comprising:

recording time-stamped video and audio data;
obtaining time-stamped handwriting data entries from an electronic writing instrument, wherein the handwriting data comprises a handwriting time-stamp recorded during the session;
synchronizing and indexing the video and audio data with the handwriting data;
displaying in a single screen, a first region comprising the handwriting data, a second region comprising the video and audio data, and a third region comprising a timeline of the video and audio data;
displaying a selectable list of faculties to be developed during a session; and
printing on a sheet of paper at least one form comprising a list of tasks designed to develop at least one selected faculty, and a unique pattern representative of the vertical and horizontal coordinates of the paper.

11. The non-transitory computer readable medium of claim 10, further comprising instructions for separately and selectably displaying in the first region each discrete handwriting data entry in a tabular format.

12. The non-transitory computer readable medium of claim 10, displaying the timeline comprising displaying segments on the timeline indexed to correspond to the handwriting data entries displayed in the first region.

13. The non-transitory computer readable medium of claim 10, further comprising instructions for synchronizing the video and audio data with the handwriting data by associating a discrete period of time with each handwriting data entry, representative of the time during which an event related to the handwriting data entry occurred.

14. The non-transitory computer readable medium of claim 13, further comprising instructions for displaying in the second region the video data representation of the discrete period of time associated with a handwriting data entry selected in the first region.

15. The non-transitory computer readable medium of claim 14, further comprising instructions for displaying in the second region a toolbar with selectable video control buttons for sequentially displaying video data representative of the discrete time periods associated with each discrete handwriting data entry.

16. The non-transitory computer readable medium of claim 10, further comprising instructions for displaying in the first region handwriting data from at least two individuals, recorded during at least two temporally separate sessions.

17. The non-transitory computer readable medium of claim 10, further comprising instructions for displaying in the first region handwriting data representative of results of a plurality of separate exercises of a plurality of separate tasks.

18. The non-transitory computer readable medium of claim 10, further comprising instructions for:
displaying in a separate screen a fourth region comprising a graph and a fifth region comprising the selectable list of faculties;
displaying in the fourth region a graph representing the results of each sessions during which a faculty was developed when the faculty is selected from the fifth region;
displaying in the fourth region a pop-up window comprising results of a particular session when the user hovers a cursor over a plot on the graph representing the particular session.

\* \* \* \* \*